Patented Jan. 23, 1940

2,188,199

UNITED STATES PATENT OFFICE 2,188,199

PLASTIC COMPOSITION

Arthur John Phillip Care, Toronto, Ontario, Canada

No Drawing. Application June 29, 1937,
Serial No. 150,993

3 Claims. (Cl. 106—34)

My invention relates to a plastic composition and process of making the same and is particularly directed towards producing a plastic which may be cast or moulded.

It will be understood that the word "plastics" used herein defines a substance capable of being moulded, formed or moulded in various forms and is not to be confused with synthetic condensation products.

One of the principal features of my invention resides in the manner in and the various ingredients of which my plastic mixture are compounded to result in a product which is suitable for casting in various sizes and thicknesses and which may be used for wall board. Wall board cast from my plastic is strong, self-supporting and sufficiently resilient, or flexible, to be applied to the wall in place of the usual plaster and may be held firmly in place by nails or screws or by any one of the well known means for holding tile in place such as that sold under the trade name of "Lock-On".

A further feature of my invention resides in the fact that the plastic may be sold loose and subsequently applied to walls in a manner similar to ordinary plaster with the exception that while ordinary plaster requires at least two coats and usually three coats to make a finished wall, only one coat is required where my plastic is used. The importance of this feature cannot be too highly stressed inasmuch as it results in a considerable saving of time and money in preparing a building or room for occupancy. For example, in plastering the walls of a new building by using my plastic I am able to save from 15 to 30 days time in having the building ready for occupancy.

Further features of my invention and the manner in which I attain them will be apparent from the following description.

It will be clearly understood that I am familiar with the extensive prior art, including many existing patents, disclosing various forms of plastics and wall board, and more widely distributed being those sold under the trade names of Gyproc, Tentest, etc. I am also familiar with the fact that for many years attempts have been made to cast a self supporting wall board using ingredients such as calcined gypsum, diatomaceous earth, in one or other of its forms, asbestos and the like in order to find a plastic which would eliminate the necessity of using an envelope or paper liner to enclose the ingredients such as is used by Gyproc.

The principal ingredients used in compounding my plastic comprises calcined gypsum, preferably of that type and quality sold under the trade name of "Single F", a binder which I will describe in detail hereinafter, diatomaceous earth and water. In order to improve the physical properties of the plastic, I may also add such ingredients as salt, dextrin and sugar for purposes as will be explained hereinafter.

Referring first to the binder, I have found that one of the most important, if not the most important, ingredient of the plastic is the choice of the binder and I am aware that attempts have been made to use a binder, for plastics suitable for use as a wall board, such materials as paper, asbestos, cotton and the like. None of these have been found to be suitable, however, inasmuch as the finished wall board does not possess the necessary physical properties to withstand the stresses and strains encountered in shipping and applying the board to the wall.

I have found, therefore, that the binder must be such that the fibres are physically strong in order to withstand the disintegrating action which would normally result when strain is exerted on the wall board as in normal use. It must be extremely fibrous, the fibres having such properties as may be explained as the property of absorbing the various ingredients during the mixing and subsequent drying and hardening steps of the process. In addition, the binder must have the property of toughening the plastic rather than making it brittle as do most of the binders heretofore used. As a further property, the fibres of the binder must not coalesce during the mixing, drying and hardening steps as do such binders as paper.

I have found that a binder such as sulphite pulp meets all the requirements of a satisfactory binder and at the same time is inexpensive to purchase and very readily prepared for use. It will be appreciated that I do not wish to limit myself to that specific ingredient but rather to the physical and chemical properties embodied therein.

The addition of dextrin to the plastic is for the purpose of giving the final product a harder finish and therefore may or may not be used as desired in specific instances.

The addition of a retarder such as sugar is also a matter of choice dependent on the ultimate use of the plastic. For example, where the plastic is to be cast into sheets, the sugar would not be used as it would be most desirable to expedite the setting of the plastic as much as possible whereas if the plastic is to be applied to the wall as plaster, then it might be advantageous to retard the setting in order to give more time to work with it.

The purpose of the salt is to expedite the setting of the mixture and therefore is a matter of choice whether or not it is used. In this respect, however, I have found it advantageous to use salt when casting my plastic into sheets as set out above.

An example of the specific ingredients of my plastic is set out hereinbelow but it will be clearly understood that variations may be made therefrom under varying conditions as set out hereinbefore without departing from the scope of the appended claims:

|  | Wet basis | Dry basis |
|---|---|---|
|  | Percent by weight | Percent by weight |
| Calcined gypsum (single "F") | 44 | 73 |
| Sulphite pulp | 3 | 4.6 |
| Salt | About 1 | About 2 |
| Dextrin | 10 | 16.3 |
| Water | 40 | |
| Diatomaceous earth | 2.5 | 4.1 |

These are thoroughly mixed in order to ensure the complete co-mingling of the various ingredients and poured into a mould of the desired shape and thickness. The resulting sheet is permitted to set sufficiently to be removed from the mould after which the excess water is removed by artificial or natural means.

After drying the wall board is ready for use and may be affixed to joists or studding such as by nails or screws or may be held in place by any of the known methods of holding tile such as by tongue and groove joints and the like.

I have found that a sheet of wall board formed of my plastic is very strong and rigid yet sufficiently resilient to be applied to walls and ceilings. It has many of the characteristics of wood in that it may be shaped with knife, chisel, plane and the like. Nails or screws driven into the wall board behave in a manner similar to that when driven into wood in that they are held very firmly, the wall board showing no tendency toward brittleness, and heavy loads may be dependent on such nails or screws without danger of their drawing out.

When the plastic is prepared for applying directly to the wall, it will be naturally prepared in dry form and the necessary water added when the actual plastering is being done. It will be apparent that the above percentages will be varied accordingly.

The plastic bonds tightly to the lath and the properties being similar to those of the wall board set out above, the toughness of the finished plaster eliminates any danger of it breaking loose from the lath as often happens with ordinary plaster. In addition, tests have shown that my plastic, when hardened, is substantially waterproof and therefore any danger of the plaster breaking loose from the lath after immersion in water is substantially eliminated.

The treatment given the binder, such as sulphite pulp which is received from the pulp mill in large heavy sheets, is that it is first thoroughly dried until it is substantially free from moisture. It is then disintegrated and comminuted, until the fibres pass through a ¼" mesh screen after which it is ready for use.

Inasmuch as the binder is the only ingredient which is not fire resistant, I have found also that it may be further treated before use to make it fire resistant.

As a further treatment the plastic may be made into various shades of colours by mixing with the ingredients the necessary dye-stuffs and the resulting product be made in extremely attractive colours and cast or moulded in such a manner as to present a highly polished outwardly facing surface.

These and other modifications may be embodied without departing from the scope of the appended claims.

This application is a continuation in part of my copending application No. 57,952, filed January 7th, 1936.

Having thus fully described my invention what I claim as new and desire to secure by Letters Patent is:

1. A composition of matter comprising a substantially homogeneous mixture containing from 65% to 75% calcined gypsum, 3% to 6% disintegrated sulphite pulp, and 2% to 5% diatomaceous earth.

2. A composition of matter comprising a substantially homogeneous mixture containing 65% to 75% calcined gypsum, 3% to 6% disintegrated sulphite pulp, 2% to 5% diatomaceous earth and from 10% to 20% dextrin.

3. A composition of matter comprising a substantially homogeneous mixture containing 65% to 75% calcined gypsum, 3% to 6% disintegrated sulphite pulp, 2% to 5% diatomaceous earth, 10% to 20% dextrin and 1% to 4% common salt.

ARTHUR JOHN PHILLIP CARE.